United States Patent
Mittal et al.

(10) Patent No.: US 10,764,234 B2
(45) Date of Patent: Sep. 1, 2020

(54) METHOD AND SYSTEM FOR HOST DISCOVERY AND TRACKING IN A NETWORK USING ASSOCIATIONS BETWEEN HOSTS AND TUNNEL END POINTS

(71) Applicant: Arista Networks, Inc., Santa Clara, CA (US)

(72) Inventors: Anuraag Mittal, Santa Clara, CA (US); Aparna Karanjkar, Santa Clara, CA (US); Prateek Nigam, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 118 days.

(21) Appl. No.: 15/798,979

(22) Filed: Oct. 31, 2017

(65) Prior Publication Data

US 2019/0132278 A1 May 2, 2019

(51) Int. Cl.
*H04L 29/12* (2006.01)

(52) U.S. Cl.
CPC ........ *H04L 61/103* (2013.01); *H04L 61/1552* (2013.01); *H04L 61/6022* (2013.01)

(58) Field of Classification Search
CPC .......................... H04L 61/103; H04L 61/1552; H04L 61/6022
See application file for complete search history.

(56) References Cited

U.S. PATENT DOCUMENTS

| | | | | |
|---|---|---|---|---|
| 8,477,715 B2 * | 7/2013 | Bahini | ............... | H04L 29/12018 370/331 |
| 8,811,409 B2 * | 8/2014 | Allan | ................. | H04L 12/4662 370/395.53 |
| 8,948,054 B2 * | 2/2015 | Kreeger | ................... | H04L 41/12 370/255 |
| 9,143,400 B1 * | 9/2015 | Roskind | .............. | H04L 41/0896 |
| 9,204,345 B1 * | 12/2015 | Roskind | ................ | H04L 63/101 |
| 9,462,502 B2 * | 10/2016 | Kim | ....................... | H04W 28/02 |
| 9,509,603 B2 * | 11/2016 | Duda | ...................... | H04L 45/74 |
| 9,596,099 B2 | 3/2017 | Yang et al. | | |
| 9,621,508 B2 * | 4/2017 | Duda | .................. | H04L 12/4633 |
| 9,654,300 B2 * | 5/2017 | Pani | ....................... | H04L 12/18 |

(Continued)

FOREIGN PATENT DOCUMENTS

EP    2182694 A1    5/2010

OTHER PUBLICATIONS

International Search Report issued in corresponding Application No. PCT/US2019/049134, dated Oct. 30, 2019.

(Continued)

*Primary Examiner* — Daniel C. Murray
(74) *Attorney, Agent, or Firm* — Chamberlain, Hrdlicka, White, Williams & Aughtry

(57) ABSTRACT

A system and method for host discovery and tracking in a network. Specifically, the disclosed system and method entail maintaining bindings pertinent to the mapping of any host in the network, by way of their host IP address, to a respective virtual tunnel end point (VTEP). More specifically, these bindings may include: (i) a host IP address to host MAC address binding or mapping; and (ii) a host MAC address to VTEP IP address binding or mapping. Further, these bindings may be especially significant towards directing network traffic to a host over virtual layer-3 (L3) protocols.

20 Claims, 5 Drawing Sheets

(56) References Cited

U.S. PATENT DOCUMENTS

| | | | |
|---|---|---|---|
| 9,654,409 B2* | 5/2017 | Yadav | H04L 47/50 |
| 10,187,302 B2* | 1/2019 | Chu | H04L 45/22 |
| 10,298,538 B2* | 5/2019 | Yang | H04L 67/1097 |
| 2006/0002324 A1* | 1/2006 | Babbar | H04L 29/1232 370/325 |
| 2008/0019319 A1* | 1/2008 | Bahini | H04L 29/12018 370/331 |
| 2008/0205377 A1* | 8/2008 | Chao | H04L 69/40 370/351 |
| 2014/0006706 A1 | 1/2014 | Wang | |
| 2014/0064091 A1 | 3/2014 | Basso et al. | |
| 2014/0112122 A1* | 4/2014 | Kapadia | H04L 45/74 370/219 |
| 2014/0198647 A1 | 7/2014 | Chowdhury et al. | |
| 2015/0023352 A1 | 1/2015 | Yang et al. | |
| 2015/0058470 A1* | 2/2015 | Duda | H04L 12/4633 709/224 |
| 2015/0098359 A1 | 4/2015 | Yen et al. | |
| 2015/0103679 A1* | 4/2015 | Tessmer | H04L 43/0811 370/252 |
| 2015/0124586 A1* | 5/2015 | Pani | H04L 12/18 370/219 |
| 2015/0149657 A1* | 5/2015 | Reddy | H04L 45/72 709/242 |
| 2015/0381495 A1 | 12/2015 | Cherian et al. | |
| 2016/0014241 A1 | 1/2016 | Tai | |
| 2016/0036703 A1* | 2/2016 | Josyula | H04L 45/66 370/392 |
| 2016/0080247 A1 | 3/2016 | Yang et al. | |
| 2016/0156560 A1 | 6/2016 | Yasuda | |
| 2016/0173529 A1* | 6/2016 | Baig | H04L 63/1458 726/13 |
| 2016/0182382 A1 | 6/2016 | Singaravelu et al. | |
| 2016/0277497 A1* | 9/2016 | Bannister | H04L 67/1097 |
| 2016/0330046 A1 | 11/2016 | Yang et al. | |
| 2016/0381015 A1* | 12/2016 | Ravinutala | H04W 80/02 726/7 |
| 2017/0093758 A1* | 3/2017 | Chanda | H04L 49/35 |
| 2017/0099182 A1 | 4/2017 | DeBolle et al. | |
| 2017/0214549 A1 | 7/2017 | Yoshino et al. | |
| 2017/0289031 A1 | 10/2017 | Duda | |
| 2017/0308828 A1 | 10/2017 | Viquez Calderon | |
| 2017/0346736 A1 | 11/2017 | Chander et al. | |
| 2018/0123827 A1* | 5/2018 | Josyula | H04L 12/4641 |
| 2018/0139098 A1 | 5/2018 | Sunavala et al. | |
| 2019/0028424 A1 | 1/2019 | Mittal et al. | |
| 2019/0173888 A1* | 6/2019 | Li | H04L 29/12 |
| 2019/0215175 A1 | 7/2019 | Mathew et al. | |

OTHER PUBLICATIONS

Written Opinion issued in corresponding Application No. PCT/US2019/049134, dated Oct. 30, 2019.

* cited by examiner

METHOD AND SYSTEM FOR HOST DISCOVERY AND TRACKING IN A NETWORK USING ASSOCIATIONS BETWEEN HOSTS AND TUNNEL END POINTS

BACKGROUND

The reliance on statically known information regarding the whereabouts of a host in a network can yield incorrect information, especially if the network undergoes any dynamic changes after its initial configuration.

SUMMARY

In general, in one aspect, embodiments of the invention relate to a method for locating a host in a network. The method includes receiving, by a cloud service, a query including a host Internet Protocol (IP) address associated with the host, obtaining, using the host IP address, a host media access control (MAC) address for the host, and locating the host by identifying, using the host MAC address, a virtual tunnel end point (VTEP) operatively connected to the host.

In general, in one aspect, embodiments of the invention relate to a system. The system includes a plurality of network elements, and a cloud service operatively connected to the plurality of network elements. Further, the cloud service is configured to receive a query including a host Internet Protocol (IP) address associated with a host, obtain, using the host IP address, a host media access control (MAC) address for the host, and locate the host by identifying, using the host MAC address, a virtual tunnel end point (VTEP) operatively connected to the host.

In general, in one aspect, embodiments of the invention relate a non-transitory computer readable medium (CRM) including computer readable program code, which when executed by a computer processor, enables the computer processor to receive a query including a host Internet Protocol (IP) address associated with a host in a network, obtain, using the host IP address, a host media access control (MAC) address for the host, and locate the host by identifying, using the host MAC address, a virtual tunnel end point (VTEP) operatively connected to the host.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system and method for host discovery and tracking in a network. Specifically, one or more embodiments of the invention entails maintaining bindings pertinent to the mapping of any host in the network, by way of their host IP address, to a respective virtual tunnel end point (VTEP). More specifically, these bindings may include: (i) a host IP address to host MAC address binding or mapping; and (ii) a host MAC address to VTEP IP address binding or mapping. Further, these bindings may be especially significant towards directing network traffic to a host over virtual layer-3 (L3) protocols.

Figure 1:
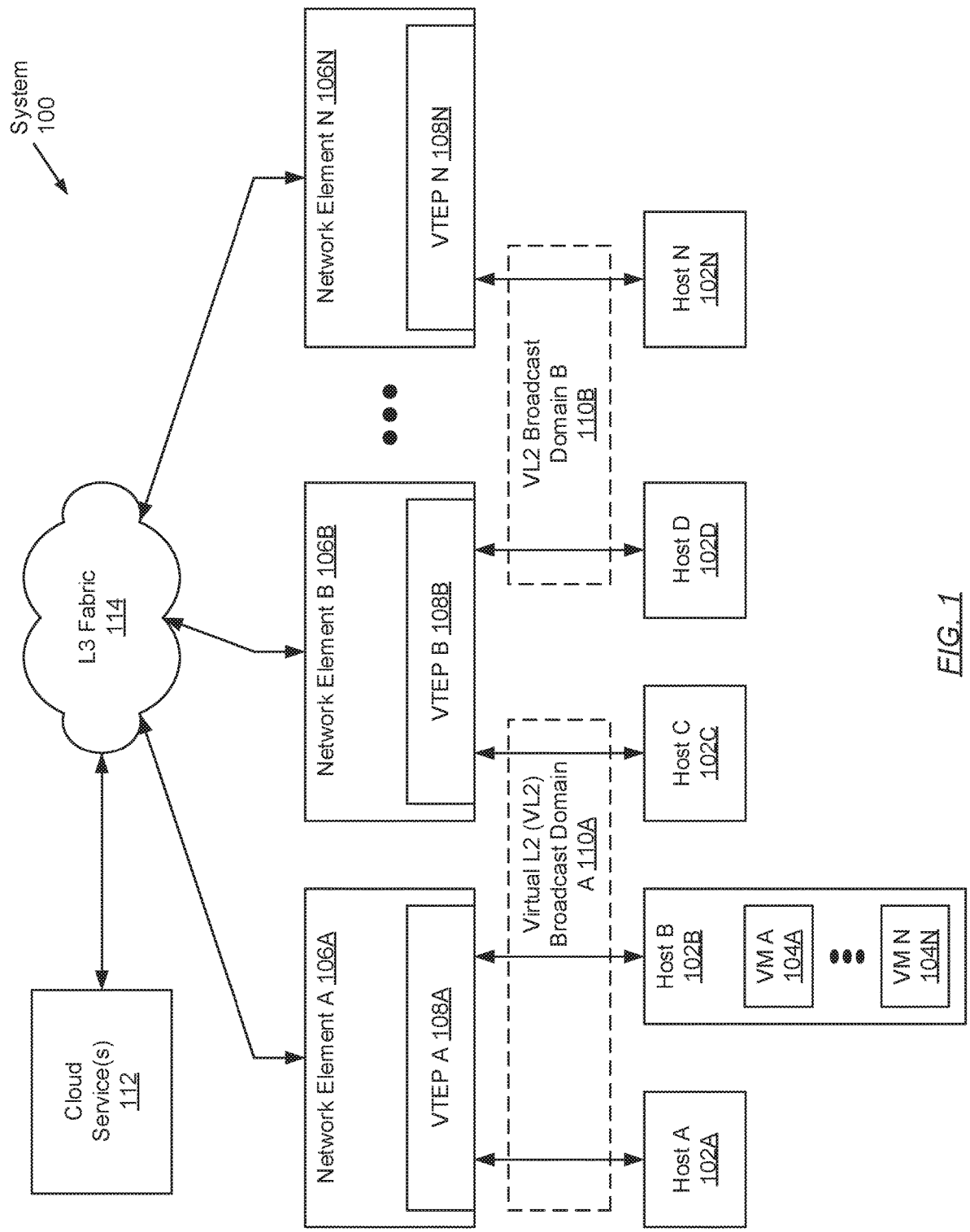
FIG. 1 shows a system in accordance with one or more embodiments of the invention.

FIG. 1 shows a system in accordance with one or more embodiments of the invention. The system (100) includes one or more network element(s) (106A-106N) operatively connected to one or more cloud service(s) (112) through a layer-3 (L3) fabric (114). The system (100) further includes, directly connected to each network element (106A-106N), one or more host(s) (102A-102N). On each host (102A-102N), one or more virtual machine(s) (VMs) (104A-104N) may execute. In addition, a respective virtual tunnel end point (VTEP) (108A-108N) may be executing on each network element (106A-106N). The system (100) also includes one or more virtual layer-2 (L2) broadcast domain(s) (110A, 110B). Each of these components is described below.

In one embodiment of the invention, a network element (106A-106N) may be a physical device that includes persistent storage, memory (e.g., random access memory (RAM), shared memory), one or more computer processor(s) (e.g., integrated circuits) (including a switch chip or network processor)), and two or more physical network interfaces or ports. The switch chip or network processor may be hardware that determines out of which egress port on the network element (106A-106N) to forward media access control (MAC) frames. The switch chip or network processor may include egress and ingress ports that may connect to the physical network interfaces or ports on the network element (106A-106N). Further, each physical network interface or port may or may not be connected to another component (e.g., a host (102A-102N), to another network element (106A-106N), or to the L3 fabric (114)) in the system (100). A network element (106A-106N) may be configured to receive network packets via the network interfaces or ports, and determine whether to: (i) drop the network packet; (ii) process the network packet in accordance with one or more embodiments of the invention; and/or (iii) send the network packet, based on the processing, out another network interface or port on the network element (106A-106N). In another embodiment of the invention, a network element (106A-106N) may be a virtual device implemented through the cooperation of one or more virtual machines (described below) and/or one or more containers (described below).

How the network element (106A-106N) makes the determination of whether to drop a network packet, and/or send a network packet to another component in the system (100) depends, in part, on whether the network element (106A-106N) is a L2 switch or a L3 switch (also referred to as a multilayer switch), which may perform at least some functions of a router. If the network element (106A-106N) is operating as a L2 switch, the network element (106A-106N) uses the destination MAC address along with a forwarding table or policy to determine out of which network interface or port to send the network packet. If the network element (106A-106N) is operating as a L3 switch, the network element (106A-106N) uses the destination Internet Protocol (IP) address along with a routing table or policy to determine out of which network interface or port to send the network packet. As a L3 switch, the network element (106A-106N) may additionally include the ability to write the MAC address of the next hop (or component) to receive the network packet in place of its own MAC address (which the last hop or component to send the network packet wrote) in the L2 information encapsulating the network packet. If the network element (106A-106N) is a multilayer switch, the network element (106A-106N) includes functionality to process network packets using both MAC addresses and IP addresses.

In one embodiment of the invention, the persistent storage on a network element (106A-106N) may include any type of non-transitory computer readable medium that includes instructions, which, when executed by the one or more computer processor(s), enable the network element (106A-106N) to perform any of the functionalities described herein. Moreover, examples of a network element (106A-106N) include, but are not limited to, a switch, a router, and a multilayer switch. A network element (106A-106N) is not limited to the aforementioned specific examples.

In one embodiment of the invention, a network element (106A-106N) may include a VTEP (108A-108N). A VTEP (108A-108N) may be an entity (e.g., software) which originates and/or terminates virtual L3 (VL3) tunnels. Further, a VTEP (108A-108N) may be capable of: (i) encapsulating a MAC frame, generated by an operatively connected host (102A-102N) and/or VM (104A-104N), to obtain a VL3 frame; (ii) receiving a VL3 frame destined for an operatively connected host (102A-102N) and/or VM (104A-104N) from a remote VTEP (108A-108N); and (iii) decapsulating (i.e., removing the VL3 frame header from) a received VL3 frame to obtain a MAC frame therein before delivering the MAC frame to an operatively connected host (102A-102N) and/or VM (104A-104N). In one embodiment of the invention, a VL3 frame may be a virtual extensible local area network (VXLAN) frame, whereas the virtual tunnel through which VXLAN frames traverse may be a VXLAN tunnel. Embodiments of the invention are not limited to any specific implementation or protocol for generating/instantiating VL3 frames and/or virtual tunnels.

In one embodiment of the invention, a VL2 broadcast domain (11A, 110B) may be defined as the set of computing devices (e.g., hosts (102A-102N), VMs (104A-104N), etc.) that communicate using the same virtual network identifier (VNI), where the VNI is defined by, for example, the VXLAN protocol. A VNI identifies the scope of the MAC frame originated by a computing device such that the MAC frame may only be sent to another computing device associated with the same VNI. In one embodiment of the invention, a MAC frame may be sent to a computing device associated with a different VNI if the MAC frame is routed into a new VL2 broadcast domain (110A, 110B). By way of examples, the VL2 broadcast domains (110A, 110B) shown in FIG. 1 may be implemented as virtual local area network (VLAN) domains and/or VXLAN domains. Embodiments of the invention are not limited to these specific examples.

In one embodiment of the invention, a host (102A-102N) may be any type of system (e.g., software and computer hardware) that is configured to generate, send, receive, and/or process requests and replies either locally or over a network using software and computer hardware. A host (102A-102N) may include one or more processor(s), memory, and one or more physical network interface(s). Further, a host (102A-102N) may include functionality to generate, receive, and/or transmit MAC frames. Examples of a host (102A-102N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the invention, one or more VMs (104A-104N) may be executing on a host (102A-102N). A VM (104A-104N) may be a software based emulation of a computing device. Subsequently, a VM (104A-104N) may be assigned all or a portion of the various hardware included in the underlying physical system (i.e., host (102A-102N)) that is serving as the VM host. Hosting a VM (104A-104N) may include, but is not limited to, providing the VM (104A-104N) the hardware resources assigned to the VM (104A-104N), scheduling time for the VM (104A-104N) to use various physical hardware resources (e.g., a processor, network resources, etc.), and translating instructions from the VM (104A-104N) into instructions that are understood by the underlying physical hardware, operating system, and/or hypervisor of the host (102A-102N). In one embodiment of the invention, a hypervisor (i.e., a virtual machine monitor) may be computer software that includes the ability to create, execute, and/or, at least in part, manage VMs (104A-104N) executing on a host (102A-102N). Moreover, a VM (104A-104N) may include functionality to generate, receive, and/or transmit MAC frames.

In one embodiment of the invention, one or more containers (not shown) may be executing on a host (102A-102N). A container may be an isolated, lightweight virtualization mechanism (or software construct) that allows for the running of an application or an operating system within the container without the overhead of executing a hypervisor (as is needed for executing VMs (104A-104N) on underlying hardware). Minimal overhead may be generated by containers because: (i) containers share the same operating system kernel with other containers and the underlying host; and (ii) containers (unlike VMs) do not need to emulate physical hardware. Further, in one embodiment of the invention, a container may be implemented virtually by a host operating system.

In one embodiment of the invention, a cloud service (112) may be a platform for the centralized management of and/or consolidation of state information for all or a portion of the network elements (106A-106N) in the system (100). A cloud service (112) may be implemented as one or more physical or virtual device(s), which includes at least one or more processor(s), memory, and one or more physical network interface(s). In one embodiment of the invention, a cloud service (112) includes executable instructions (stored in a non-transitory computer readable medium), which when executed, enable the cloud service (112) to perform embodiments of the invention described below (see e.g., FIGS. 3A and 3B).

In one embodiment of the invention, a cloud service (112) may include a data repository (not shown). The data repository may be any type of storage unit and/or device (e.g., a file system, database, collection of tables, or any other storage medium) for storing data. Further, the data repository may include multiple different storage units and/or devices. The multiple different storage units and/or devices may or may not be of the same type or located at the same physical site. The data repository may include functionality to store bindings pertinent to embodiments of the invention (described below) (see e.g., FIGS. 2A and 2B). One of ordinary skill will appreciate that the data repository may store additional information pertinent to the management of and/or consolidation of state for all or a portion of the network elements (106A-106N) in the system (100) without departing from the scope of the invention. For example, the data repository may store other bindings, which include, but are not limited to: (i) a network element to VTEP binding, which may identify which VTEP (108A-108N) is executing on which network element (106A-106N); (ii) a VTEP to host binding, which may identify which hosts (102A-102N) are connected to which VTEP (108A-108N); and (iii) a host to VM binding, which may identify which VMs (104A-104N) are executing on which host (102A-102N).

In one embodiment of the invention, the L3 fabric (114) may be a set of interconnected network elements or systems, which operatively connect the cloud service (112) to the one or more network element(s) (106A-106N) of the system (100). The L3 fabric (114) includes functionality to facilitate communications between these aforementioned components. The L3 fabric (114) may include any combination of local area network (LAN) and/or wide area network (WAN) segments, such as the Internet, which may employ any combination of wired and/or wireless connections and communication protocols.

While FIG. 1 shows a configuration of components, other system configurations may be used without departing from the scope of the invention. For example, the system (100) may further include one or more service device(s) (not shown) directly connected to one or more of the network element(s) (106A-106N) (see e.g., FIG. 4).

In one embodiment of the invention, a service device may be a physical or virtual computing device that includes functionality to provide a network service to network elements (106A-106N), hosts (102A-102N), and/or VMs (104A-104N) physically located at any position within the system (100). A service device may include at least one or more processor(s), memory, and two or more physical interfaces. In one embodiment of the invention, a service device may include functionality to process network traffic, redirected to them, in accordance with the configuration of, and the specific network service thus provided by, the service device to components of the system (100) (or network). Subsequently, a service device may include functionality to filter, mirror, store, forward, drop, and/or perform any other action, or any combination thereof, to redirected network traffic, which is afforded by the configuration and provided network service of the service device. Examples of a service device include, but are not limited to, a network security device (e.g., a firewall device, a denial of service (DOS) attack scrubber), a network filtering device (e.g., a web content filter), a network data cache (e.g., a web-cache device), and a network load balancing device.

Figure 2A:
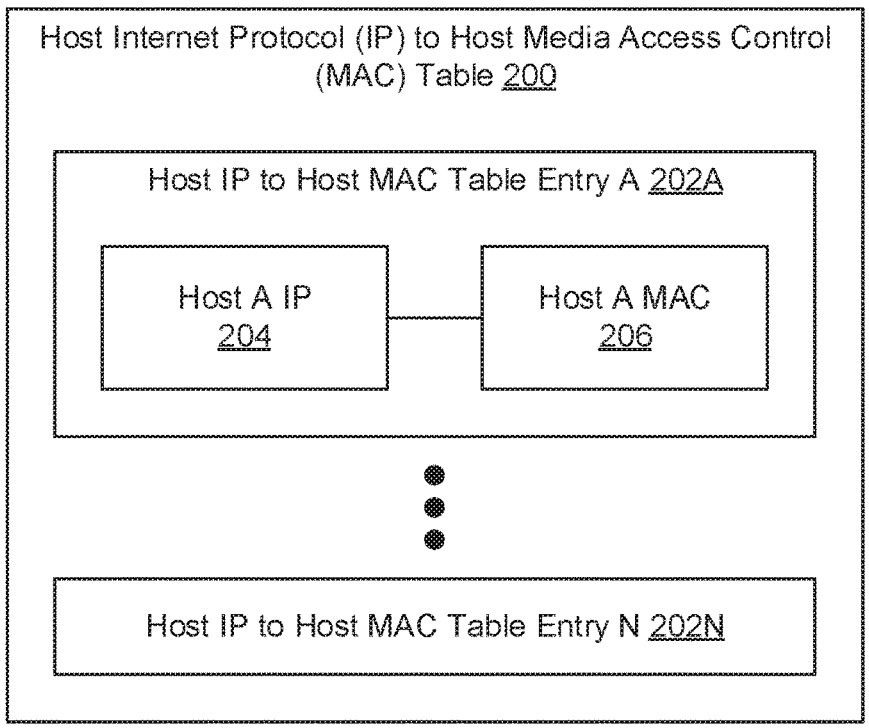
FIG. 2A shows a host IP to host MAC table in accordance with one or more embodiments of the invention.

FIG. 2A shows a host IP to host MAC table in accordance with one or more embodiments of the invention. The host IP to host MAC table (200) may be a data repository for storing bindings relating host IP addresses and host MAC addresses. As a data repository, the host IP to host MAC table (200) may take the form of any type of storage unit and/or device such as, for example, a file system, a database, a collection of tables, or any other storage medium or structure. In one embodiment of the invention, the host IP to host MAC table (200) may reside in, and be programmed by processes executing on, one or more cloud service(s) (see e.g., FIG. 1, 112).

In one embodiment of the invention, the host IP to host MAC table (200) includes one or more table entries (202A-202N). Each table entry (202A-202N) may include a host IP address (204) associated with a host (see e.g., FIG. 1, 102A-102N) and a corresponding host MAC address (206) for the host. In one embodiment of the invention, the host IP to host MAC table (200) may be populated through the generation of table entries (202A-202N) based on received ARP responses (including host MAC addresses) to submitted ARP requests (including host IP addresses) (see e.g., FIG. 3B).

Figure 2B:
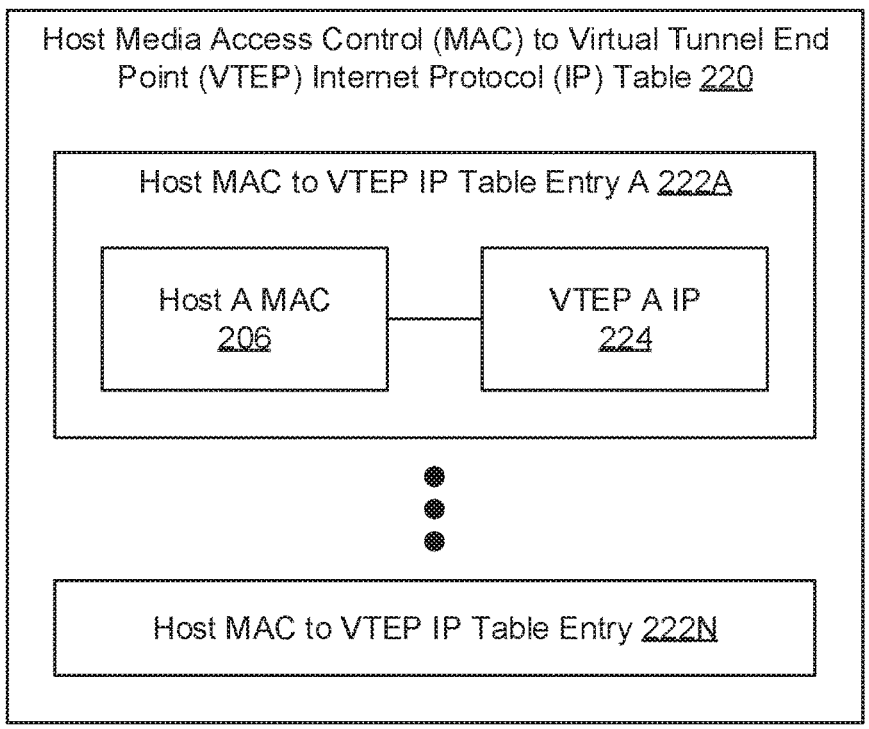
FIG. 2B shows a host MAC to VTEP IP table in accordance with one or more embodiments of the invention.

FIG. 2B shows a host MAC to VTEP IP table in accordance with one or more embodiments of the invention. The host MAC to VTEP IP table (220) may be a data repository for storing bindings relating host MAC addresses and VTEP IP addresses. As a data repository, the host MAC to VTEP IP table (220) may take the form of any type of storage unit and/or device such as, for example, a file system, a database, a collection of tables, or any other storage medium or structure. In one embodiment of the invention, the host MAC to VTEP IP table (220) may reside in, and be programmed by processes executing on, one or more cloud service(s) (see e.g., FIG. 1, 112).

In one embodiment of the invention, the host MAC to VTEP IP table (220) includes one or more table entries (222A-222N). Each table entry (222A-222N) may include a host MAC address (206) associated with a host (see e.g., FIG. 1, 102A-102N) and a corresponding VTEP IP address (224) associated with a VTEP (see e.g., FIG. 1, 108A-108N) executing on a network element directly connected to the host. Each table entry (222A-222N) may further include a timestamp (not shown) specifying a date and time the content (i.e., binding) in the table entry (222A-222N) was generated, received, or otherwise obtained by a cloud service. In one embodiment of the invention, the host MAC address (206), the VTEP IP address (224), and the timestamp may collectively be referred to as a host registration mapping.

Furthermore, in one embodiment of the invention, the host MAC to VTEP IP table (220) may be populated through the generation of table entries (222A-222N) based on network element management and/or state information consolidated on one or more cloud services. By way of an example, the VTEP IP address (224) within a table entry (222A-222N) may be obtained (and thus associated with a host MAC address (206)) from information shared by every VTEP in a network, which may be consolidated in one or more cloud services. Accordingly, in one embodiment of the invention, each VTEP in the network may share VTEP to host bindings (not shown), which a respective VTEP (and thus, the one or more cloud services) may maintain as a data structure to track the computing systems (e.g., hosts, VMs, etc.) to which the respective VTEP is connected.

Figure 3A:
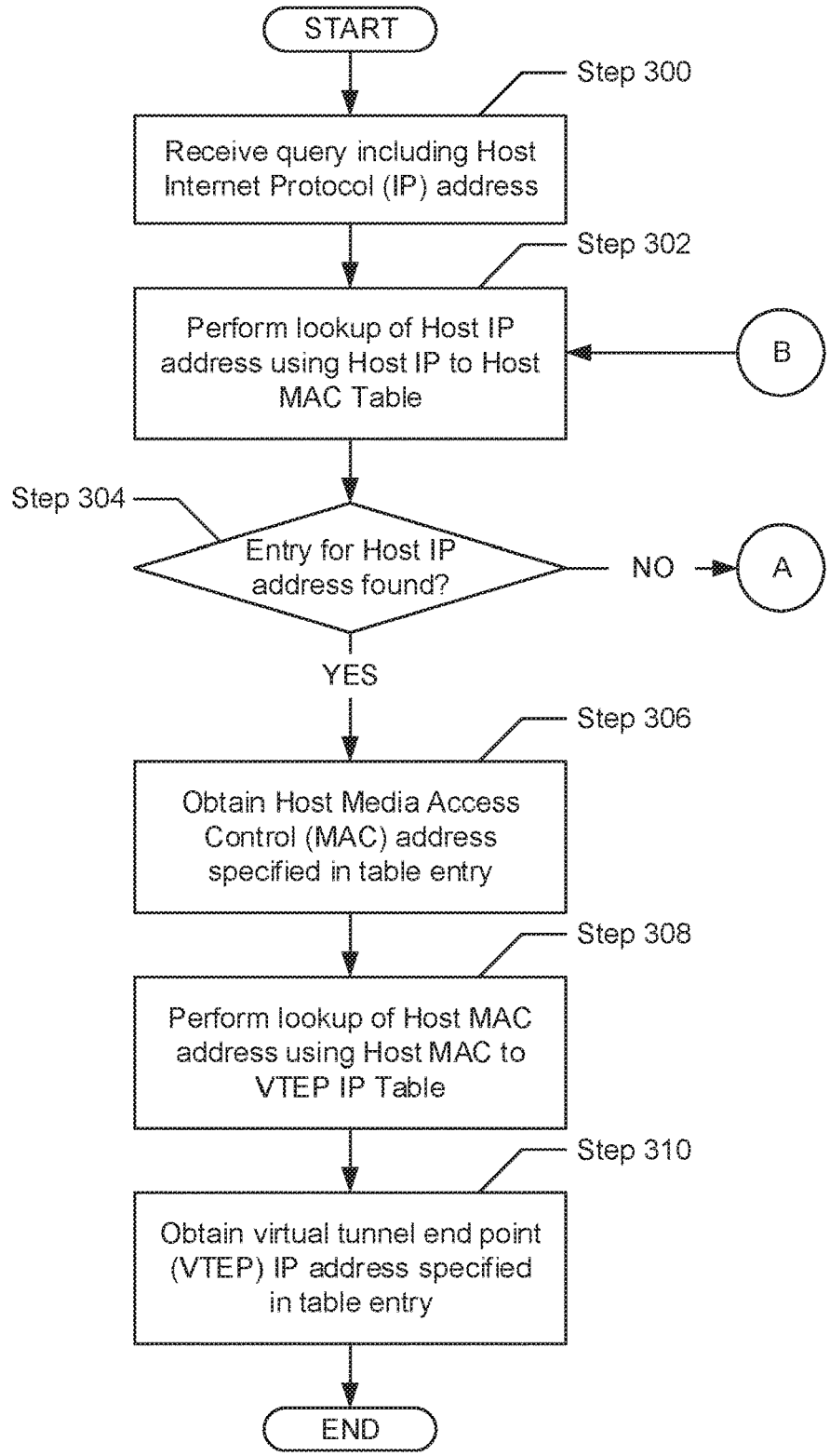
FIGS. 3A and 3B show flowcharts describing a method for discovering a host in a network in accordance with one or more embodiments of the invention.
Figure 3B:
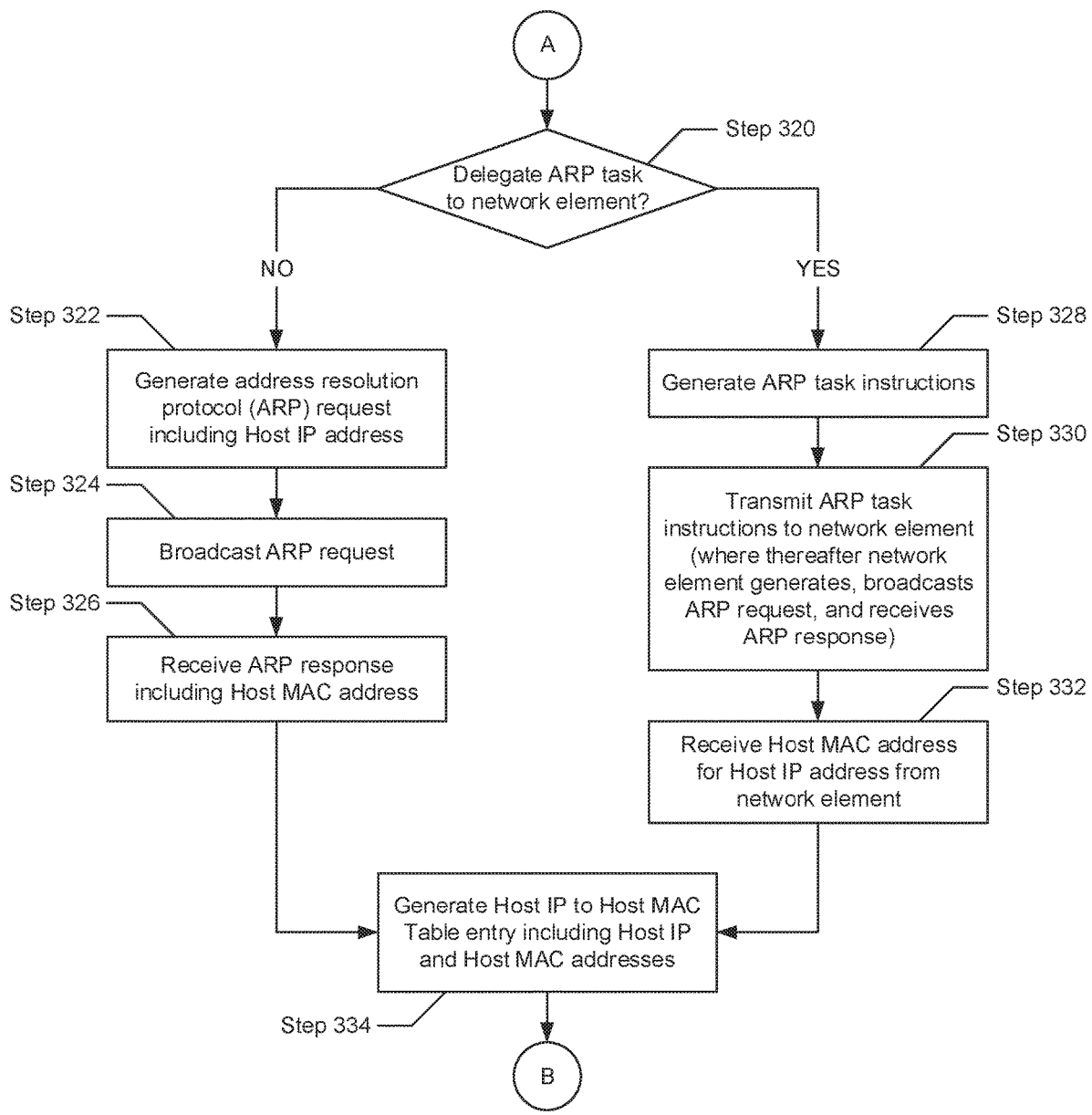

FIGS. 3A and 3B show flowcharts describing a method for discovering a host in a network in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A and 3B may be performed in parallel with any other steps shown in FIGS. 3A and 3B without departing from the scope of the invention.

Turning to FIG. 3A, in Step 300, a query is received by a cloud service (see e.g., FIG. 1, 112). In one embodiment of the invention, the query includes a host IP address associated with a host (see e.g., FIG. 1, 102A-102N) managed by the cloud service. The query may be submitted by another host, a virtual machine (see e.g., FIG. 1, 104A-104N) executing on a host, another cloud service, or a service device.

In Step 302, a lookup is performed on the host IP to host MAC table (see e.g., FIG. 2A) using the host IP address (received in Step 300). In Step 304, a determination is made, based on the lookup (performed in Step 302), as to whether a table entry is found in the host IP to host MAC table that specifies the host IP address. If it is determined that a table entry has been found in the host IP to host MAC table that specifies the host IP address, the process proceeds to Step 306. In one embodiment of the invention, host IP to host MAC bindings (included in a table entry) may be obtained through at least the following ways: (i) by the cloud service directly obtaining the binding from a particular network element; (ii) by the cloud service obtaining the binding from another cloud service, wherein the other cloud service has the binding and may or may not advertise this information; and (iii) by the cloud service initiating (or delegating the task to a network element of initiating) an ARP request for the host MAC address, which is broadcasted to the various network elements in the network (see e.g., FIG. 3B). On the other hand, if it is determined that no table entry has been found in the host IP to host MAC table that specifies the host IP address, the process proceeds to Step 320 (see e.g., FIG. 3B). In one embodiment of the invention, the host IP to host MAC table may not include a table entry specifying the host IP address in response, but not limited, to the following scenarios: (i) the deletion of the respective table entry after the elapsing of a specified amount of time, wherein the respective table entry may be designated as a stale record and therefore unavailable (or invalid); (ii) the respective table entry may not be entered (or may be entered as an incomplete table entry) as a result of a previous unresolved ARP request (i.e., an ARP response for the request had not been received); (iii) technical issues around the network (e.g., network element and/or cloud service failover) may be preventing the sharing of information to generate or obtain the host IP to host MAC addresses binding.

In Step 306, after determining (in Step 304) that a table entry has been found in the host IP to host MAC table that specifies the host IP address, the corresponding host MAC address also specified in the table entry is obtained.

In Step 308, a lookup is performed on the host MAC to VTEP IP table (see e.g., FIG. 2B) using the host MAC address (obtained in Step 306). In one embodiment of the invention, the lookup results in the identifying of a table entry in the host MAC to VTEP IP table that specifies the host MAC address. In Step 310, following this identification, the corresponding VTEP IP address also specified in the table entry is obtained. As mentioned above, this VTEP IP address may be associated with the VTEP executing on a network element directly connected to the host being located by way of the query (received in Step 300).

In another embodiment of the invention, the lookup (performed in Step 308) results in the absence of a table entry in the host MAC to VTEP IP table that specifies the host MAC address. Subsequently, in such an embodiment, alternative network element management and/or state information consolidated on one or more cloud services may be used to generate a new table entry in the host MAC to VTEP IP table. By way of an example, information maintained (and shared) by VTEPs in the network may include bindings that track which computing systems (e.g., hosts, VMs, etc.) are connected to which VTEP. Such bindings may be used by VTEPs in order to determine which remote VTEP to which to instantiate virtual layer-3 (VL3) tunnels (e.g., virtual extensible local area network (VXLAN) tunnels, generic routing encapsulation (GRE) tunnels, multi-protocol label switching (MPLS) tunnels, etc.) in order for network traffic to reach a desired computing system. Further, such VTEP to computing system bindings may include, but is not limited to including the following information: (i) a MAC address associated with a computing system (e.g., a host); (ii) an IP address associated with the computing system; (iii) a virtual network identifier (VNI) associated with a VL2 broadcast domain, with which the computing system is associated; and (iv) an IP address associated with a VTEP. Therefore, the new table entry in the host MAC to VTEP IP table may be generated using the host MAC address and VTEP IP address specified in a VTEP to computing system binding.

Turning to FIG. 3B, in Step 320, after determining (in Step 304) that no table entry has been found in the host IP to host MAC table that specifies the host IP address, another determination is made as to whether an address resolution protocol (ARP) task is to be delegated to a network element. If it is determined that the ARP task is not to be delegated (i.e., the cloud service itself will perform the ARP task), the process proceeds to Step 322. On the other hand, if it is determined that the ARP task is to be delegated (i.e., a network element will perform the ARP task), the process proceeds to Step 328.

In Step 322, after determining (in Step 320) that an ARP task will not be delegated to a network element, an ARP request is generated. In one embodiment of the invention, the ARP request includes the host IP address (received in Step 300).

In Step 324, the ARP request (generated in Step 322) is broadcasted throughout the network. In Step 326, an ARP response may be received following the broadcast of the ARP request (in Step 324). In one embodiment of the invention, the ARP response includes a host MAC address for the host associated with the host IP address (received in Step 300).

In Step 328, after determining (in Step 320) that an ARP task will be delegated to a network element, ARP task instructions are generated. In one embodiment of the invention, the ARP task instructions may include: (i) computer readable program code instructing a selected network element to generate and broadcast an ARP request and, if an ARP response is received, transmit back the included host MAC address; and (ii) the host IP address (received in Step 300).

In Step 330, the ARP task instructions (generated in Step 328) are transmitted to a selected network element. In one embodiment of the invention, a selected network element may be chosen at random. In another embodiment of the invention, a selected network element may be chosen based on specific criteria such as, for example, a path proximity to the cloud service, a bandwidth availability of the network element, a connectivity of the network element to other network elements in the network, etc. At the selected network element, after receiving the ARP task instructions, the selected network element may subsequently: (i) generate an ARP request including the host IP address; (ii) broadcast the ARP request throughout the network; and (iii) receive an ARP response including the host MAC address. Furthermore, once an ARP response is obtained, the selected network element may transmit the received host MAC address back to the cloud service. Subsequently, in Step 332, a host MAC address may be received by the cloud service (from the selected network element to which the ARP task was delegated). In one embodiment of the invention, the received host MAC address may be correspond to the host IP address (obtained via the query in Step 300).

In Step 334, after receiving the host MAC address (in Steps 326 or 332), the host IP to host MAC table (see e.g., FIG. 2A) is updated. In one embodiment of the invention, the update may entail generating a new table entry in the host IP to host MAC table. Further, the new table entry may include the host IP address (received in Step 300) and the corresponding host MAC address (obtained by way of the ARP response in Step 326 or the selected network element in Step 332). Thereafter, the process proceeds to Step 302.

Figure 4:
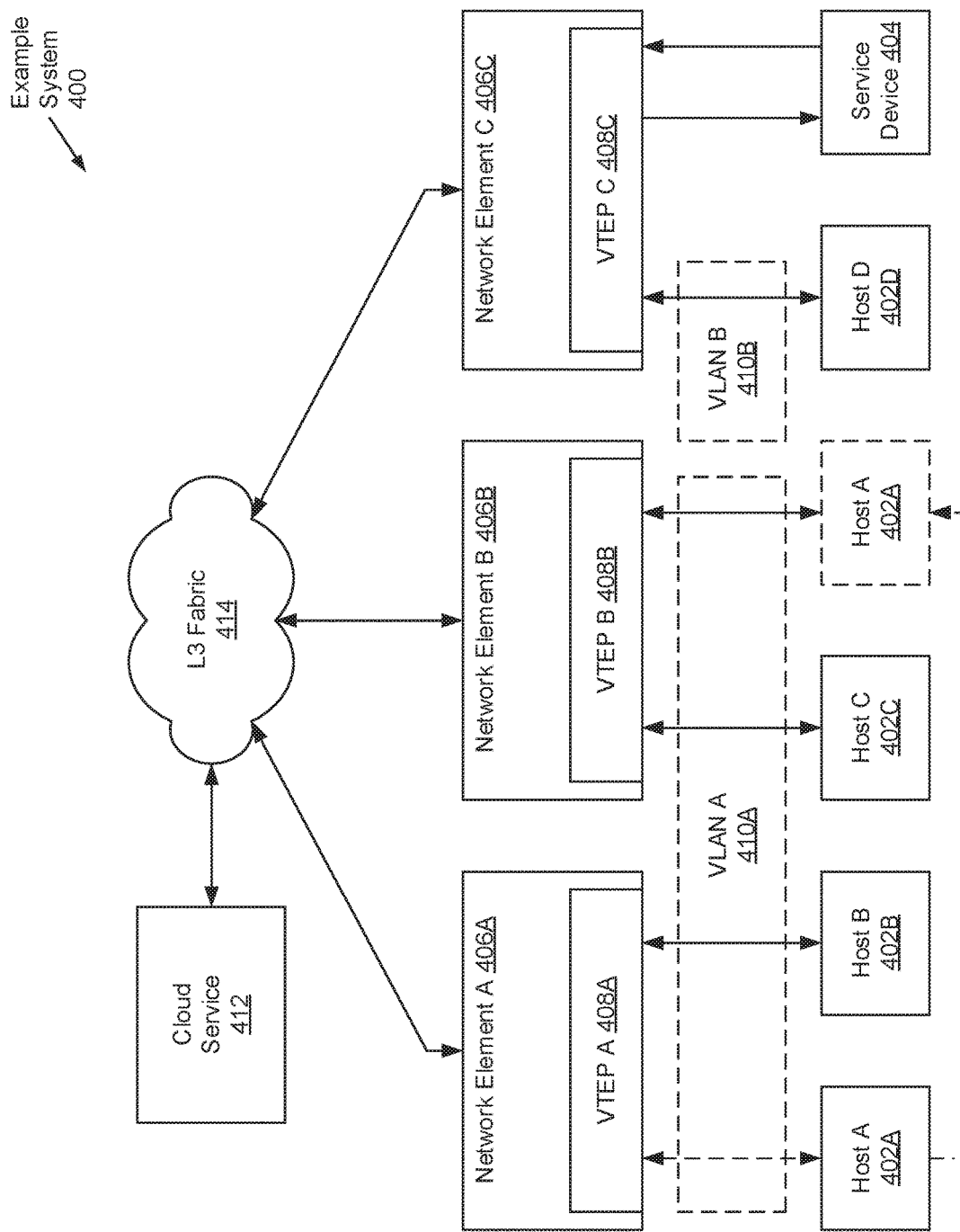
FIG. 4 shows an example system in accordance with one or more embodiments of the invention.

FIG. 4 shows an example system in accordance with one or more embodiments of the invention. The following example, presented in conjunction with components shown in FIG. 4, is for explanatory purposes only and not intended to limit the scope of the invention.

Turning to FIG. 4, the example system (400) includes three network elements—i.e., network element A (406A), network element B (406B), and network element C (406C). Each of the three network elements (406A-406C) are operatively connected to one another and a cloud service (412) through a L3 fabric (414). Further, on each of the three network elements (406A-406C), there is a VTEP executing thereon—i.e., VTEP A (408A) executing on network element A (406A), VTEP B (408B) executing on network element B (406B), and VTEP C (408C) executing on network element C (406C). The example system (400) further includes four hosts—i.e., host A (402A), host B (402B), host C (402C), and host D (402D). Host A (402A) is originally directly connected to network element A (406A), however, later migrates to become directly connected to network element B (406B). Meanwhile, hosts B, C, and D (402B-420D) remain static and are directly connected to network elements A, B, and C (406A-406C), respectively. Moreover, each of the hosts (402A-402D) are segregated into two VLANs (410A, 410B)—i.e., hosts A, B and C (402A-402C) are associated with VLAN A (410A); and host D (402D) is associated with VLAN B (410B). In addition, the example system (400) also includes a service device (404) (e.g., a firewall device) directly connected to network element C (406C).

Turning to the example, consider a scenario whereby one of the service rules (or network traffic redirection criteria) specified by the service device (404) mandates the inspection of networking traffic sourcing from and destining to host A (402A). Through the management of the network elements (406A-406C), the cloud service (412) subsequently learns of the aforementioned service rule specified by the service device (404), which is directly connected to network element C (406C). In response to learning the service rule, the cloud service (412) tries to locate host A (402A) in the example system (400). Specifically, using a host IP address associated with host A (402A), the cloud service (412) first needs to identify the host MAC address for host A (402A). Accordingly, the cloud service (412) accesses the host IP to host MAC table (see e.g., FIG. 2A) stored thereon, and performs a first lookup of the host IP to host MAC table using the host IP address associated with host A (402A).

In a first sub-scenario, host A (402A) has yet to migrate and thus resides in a known location (i.e., when host A (402A) is directly connected to network element A (406A)). In this sub-scenario, based on the above-mentioned first lookup, the cloud service (404) identifies an entry in the host IP to host MAC table that includes the host IP address associated with host A (402A). Subsequently, the cloud service (412) obtains the host MAC address also specified in the identified entry, which is also associated with host A (402A). Using the obtained host MAC address, the cloud service (412) accesses and performs a second lookup on the host MAC to VTEP IP table stored thereon. The second lookup results in the identification of an entry in the host MAC to VTEP IP table that includes the host MAC address (obtained through the first lookup). From the identified entry, the cloud service (412) then retrieves the VTEP IP address also specified therein. The VTEP IP address is associated with VTEP A (408A), to which host A (402A) is connected. Thereafter, using the retrieved VTEP IP address, the cloud service (412) transmits a command to VTEP A (408A). The command instructs VTEP A (408A) to implement the service rule (specified by the service device (404)) on the network interface of network element A (406A) that is directly connected to host A (402A).

In a second sub-scenario, host A (402A) has migrated and thus resides in an unknown location (i.e., when host A (402A) is directly connected to network element B (406B)). In this sub-scenario (similarly to the first sub-scenario), based on the above-mentioned first lookup, the cloud service (412) identifies the entry in the host IP to host MAC table that includes the host IP address associated with host A (402A). Subsequently, the cloud service (412) obtains the host MAC address also specified in the identified entry, which is also associated with host A (402A). As a side note, during the migration of a host, the stored host IP to host MAC binding for the host may be invalidated when the host MAC address (associated with the migrating host) is concurrently being reconfigured.

Returning to the second sub-scenario, however, using the obtained host MAC address, the cloud service (412) subsequently accesses and performs a second lookup of the host MAC to VTEP IP table stored thereon. The second lookup results in the failed identification of an entry in the host MAC to VTEP IP table that includes the host MAC address (obtained through the first lookup). In response to this determination, the cloud service (412) searches through other network element management and/or state information consolidated thereon, which may relate host A (402A) to one of the VTEPs (408A-408C) in the system (400). The cloud service (404) subsequently finds a binding tracked by VTEP B (408B) (and consolidated by the cloud service (412)) that includes: (i) the host MAC address associated with host A (402A); (ii) the host IP address associated with host A (402A); (iii) the VNI (not shown) associated with VLAN A (410A); and (iv) the VTEP IP address associated with VTEP B (408B). VTEP B (408B) may have advertised the aforementioned information after observing the flow of network traffic to/from host A (402A) (which is directly connected to network element B (406B) on which VTEP B (408B) is executing) from/to a source or destination residing outside VLAN A (410A) (e.g., host D (402D) of VLAN B (410B)).

Using the VTEP IP address (specified in found binding) and the host MAC address (obtained through the first lookup), the cloud service (412) generates a new table entry in the host MAC to VTEP IP table. Thereafter, using the found VTEP IP address, the cloud service (412) transmits a command to VTEP B (408B). The command instructs VTEP B (408B) to implement the service rule (specified by the service device (404)) on the network interface of network element B (406B) that is directly connected to host A (402A).

Embodiments of the invention provide a mechanism for automatically discovering and tracking dynamic changes (e.g., host migrations) occurring in a network after its initial configuration. To that effect, one or more embodiments of the invention are advantageous over existing methods and/or systems at least because: (i) embodiments of the invention does not depend on the static configuration of host information (known at the time of host introduction into the network); (ii) embodiments of the invention include the capability to communicate with multiple sources (e.g., one or more network elements in the network, one or more cloud services operatively connected to the network, etc.) to ascertain the necessary bindings to discover and track dynamic changes; (iii) embodiments of the invention does not rely on these aforementioned sources to have the necessary bindings readily available; and (iv) embodiments of the invention actively initiates, or delegates the initiation of, ARP requests to compel network elements to learn MAC addresses pertaining to hosts if the necessary bindings are not available.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for locating a host in a network, comprising:
   receiving, by a cloud service from a requesting entity, a query comprising a host Internet Protocol (IP) address associated with the host, wherein the query comprises a request to perform an action related to the host after the host has migrated from being operatively connected to a first virtual tunnel end point (VTEP) to being operatively connected to a second VTEP;
   obtaining, by the cloud service and using the host IP address, a host media access control (MAC) address for the host;
   locating, by the cloud service, the host by identifying, using the host MAC address, the second VTEP operatively connected to the host; and
   initiating, by the cloud service, after and based on locating the host, performance of the action related to the host.

2. The method of claim 1, wherein obtaining, by the cloud service and using the host IP address, the host MAC address for the host, comprises:
   performing, using the host IP address, a lookup on a host IP to host MAC table;
   determining, based on the lookup, that the host IP address is specified in the host IP to host MAC table; and
   obtaining, based on the determining, the host MAC address specified in the host IP to host MAC table corresponding to the host IP address.

3. The method of claim 1, wherein obtaining, by the cloud service and using the host IP address, the host MAC address for the host, comprises:
   performing, using the host IP address, a lookup on a host IP to host MAC table;
   determining, based on the lookup, that the host IP address is not specified in the host IP to host MAC table;
   generating, based on the determining, an address resolution protocol (ARP) request comprising the host IP address;
   broadcasting the ARP request throughout the network; and
   obtaining, in response to the broadcasting, an ARP response comprising the host MAC address.

4. The method of claim 1, wherein obtaining, by the cloud service and using the host IP address, the host MAC address for the host, comprises:
   performing, using the host IP address, a lookup on a host IP to host MAC table;
   making a first determination, based on the lookup, that the host IP address is not specified in the host IP to host MAC table;
   making a second determination, after the first determination, to delegate an address resolution protocol (ARP) task to a network element in the network;
   generating, based on the second determination, ARP task instructions comprising the host IP address;
   transmitting the ARP task instructions to the network element; and
   obtaining, after the network element broadcasts an ARP request comprising the host IP address and receives an ARP response comprising the host MAC address, the host MAC address from the network element.

5. The method of claim 1, wherein identifying, using the host MAC address, the second VTEP operatively connected to the host, comprises:
   performing, using the host MAC address, a lookup on a host MAC to VTEP IP table to obtain a VTEP IP address; and
   identifying the second VTEP as being associated with the VTEP IP address, wherein the second VTEP is executing on a network element directly connected to the host.

6. The method of claim 5, wherein the network element is one selected from a group consisting of a switch, a router, and a multilayer switch.

7. The method of claim 1, further comprising:
   receiving, from a network element in the network, a host registration mapping comprising the host MAC address, a first VTEP IP address, and a first timestamp;

identifying an existing table entry in a host MAC to VTEP IP table comprising the host MAC address, a second VTEP IP address, and a second timestamp;

determining that the first VTEP IP address is different than the second VTEP IP address and that the first timestamp is more recent than the second timestamp; and updating, based on the determining, the existing table entry to include the host registration mapping.

8. A system, comprising:

a plurality of network elements, each comprising a processor, a memory, and persistent storage; and a cloud service operatively connected to the plurality of network elements, and configured to:

receive, from a requesting entity, a query comprising a host Internet Protocol (IP) address associated with a host, wherein the query comprises a request to perform an action related to the host after the host has migrated from being operatively connected to a first virtual tunnel end point (VTEP) to being operatively connected to a second VTEP;

obtain, using the host IP address, a host media access control (MAC) address for the host;

locate the host by identifying, using the host MAC address, the second VTEP operatively connected to the host; and initiate, after and based on the host being located, performance of the action related to the host.

9. The system of claim 8, wherein to obtain, using the host IP address, the host MAC address for the host, the cloud service is further configured to:

perform, using the host IP address, a lookup on a host IP to host MAC table;

determine, based on the lookup, that the host IP address is specified in the host IP to host MAC table; and obtain, based on the determining, the host MAC address specified in the host IP to host MAC table corresponding to the host IP address.

10. The system of claim 8, wherein to obtain, using the host IP address, the host MAC address for the host, the cloud service is further configured to:

perform, using the host IP address, a lookup on a host IP to host MAC table;

determine, based on the lookup, that the host IP address is not specified in the host IP to host MAC table;

generate, based on the determining, an address resolution protocol (ARP) request comprising the host IP address;

broadcast the ARP request to the plurality of network elements; and obtain, in response to the broadcasting, an ARP response comprising the host MAC address.

11. The system of claim 8, wherein to obtain, using the host IP address, the host MAC address for the host, the cloud service is further configured to:

perform, using the host IP address, a lookup on a host IP to host MAC table;

make a first determination, based on the lookup, that the host IP address is not specified in the host IP to host MAC table;

make a second determination, after the first determination, to delegate an address resolution protocol (ARP) task to a network element of the plurality of network elements;

generate, based on the second determination, ARP task instructions comprising the host IP address;

transmit the ARP task instructions to the network element; and obtain, after the network element broadcasts an ARP request comprising the host IP address and receives an ARP response comprising the host MAC address, the host MAC address from the network element.

12. The system of claim 8, wherein to identify, using the host MAC address, the VTEP operatively connected to the host, the cloud service is further configured to:

perform, using the host MAC address, a lookup on a host MAC to VTEP IP table to obtain a VTEP IP address; and identify the second VTEP as being associated with the VTEP IP address, wherein the second VTEP is executing on a network element of the plurality of network elements, wherein the network element is directly connected to the host.

13. The system of claim 8, wherein the cloud service is further configured to:

receive, from a network element of the plurality of network elements, a host registration mapping comprising the host MAC address, a first VTEP IP address, and a first timestamp;

identify an existing table entry in a host MAC to VTEP IP table comprising the host MAC address, a second VTEP IP address, and a second timestamp;

determine that the first VTEP IP address is different than the second VTEP IP address and that the first timestamp is more recent than the second timestamp; and update, based on the determining, the existing table entry to include the host registration mapping.

14. The system of claim 8, wherein each of the plurality of network elements is one selected from a group consisting of a switch, a router, and a multilayer switch.

15. A non-transitory computer readable medium (CRM) comprising computer readable program code, which when executed by a computer processor, enables the computer processor to:

receive, by a cloud service from a requesting entity, a query comprising a host Internet Protocol (IP) address associated with a host in a network, wherein the query comprises a request to perform an action related to the host after the host has migrated from being operatively connected to a first virtual tunnel end point (VTEP) to being operatively connected to a second VTEP;

obtain, by the cloud service and using the host IP address, a host media access control (MAC) address for the host;

locate, by the cloud service, the host by identifying, using the host MAC address, the second VTEP operatively connected to the host; and initiating, by the cloud service, after and based on locating the host, performance of the action related to the host.

16. The non-transitory CRM of claim 15, further comprising additional computer readable program code, which when executed by the computer processor to obtain, by the cloud service and using the host IP address, the host MAC address for the host, enables the computer processor to:

perform, using the host IP address, a lookup on a host IP to host MAC table;

determine, based on the lookup, that the host IP address is specified in the host IP to host MAC table; and obtain, based on the determining, the host MAC address specified in the host IP to host MAC table corresponding to the host IP address.

17. The non-transitory CRM of claim 15, further comprising additional computer readable program code, which when executed by the computer processor to obtain, by the cloud service and using the host IP address, the host MAC address for the host, enables the computer processor to:

perform, using the host IP address, a lookup on a host IP to host MAC table;

determine, based on the lookup, that the host IP address is not specified in the host IP to host MAC table;

generate, based on the determining, an address resolution protocol (ARP) request comprising the host IP address;

broadcast the ARP request throughout the network; and obtain, in response to the broadcasting, an ARP response comprising the host MAC address.

18. The non-transitory CRM of claim 15, further comprising additional computer readable program code, which when executed by the computer processor to obtain, by the cloud service and using the host IP address, the host MAC address for the host, enables the computer processor to:

perform, using the host IP address, a lookup on a host IP to host MAC table;

make a first determination, based on the lookup, that the host IP address is not specified in the host IP to host MAC table;

make a second determination, after the first determination, to delegate an address resolution protocol (ARP) task to a network element in the network;

generate, based on the second determination, ARP task instructions comprising the host IP address;

transmit the ARP task instructions to the network element; and obtain, after the network element broadcasts an ARP request comprising the host IP address and receives an ARP response comprising the host MAC address, the host MAC address from the network element.

19. The non-transitory CRM of claim 15, further comprising additional computer readable program code, which when executed by the computer processor to identify, using the host MAC address, the second VTEP operatively connected to the host, enables the computer processor to:

perform, using the host MAC address, a lookup on a host MAC to VTEP IP table to obtain a VTEP IP address; and identify the second VTEP as being associated with the VTEP IP address, wherein the second VTEP is executing on a network element directly connected to the host.

20. The non-transitory CRM of claim 15, further comprising additional computer readable program code, which when executed by the computer processor, enables the computer processor to:

receive, from a network element in the network, a host registration mapping comprising the host MAC address, a first VTEP IP address, and a first timestamp;

identify an existing table entry in a host MAC to VTEP IP table comprising the host MAC address, a second VTEP IP address, and a second timestamp;

determine that the first VTEP IP address is different than the second VTEP IP address and that the first timestamp is more recent than the second timestamp; and update, based on the determining, the existing table entry to include the host registration mapping.

* * * * *